United States Patent [19]

Fischer

[11] Patent Number: 4,930,953

[45] Date of Patent: Jun. 5, 1990

[54] ENCLOSED DRUM COLLET STORAGE SYSTEM

[76] Inventor: Steven P. Fischer, 17408 W. Elmwood Rd., New Berlin, Wis. 53146

[21] Appl. No.: 431,841

[22] Filed: Nov. 6, 1989

[51] Int. Cl.[5] .............................................. B23Q 13/00

[52] U.S. Cl. ..................................... 409/134; 206/379; 211/69; 211/70.6; 279/1 R; 312/73; 408/241 R

[58] Field of Search .................... 206/379; 211/69, 70, 211/77, 78, 84, 115, 164, 70.6; 409/134; 408/241 R; 279/1 R; 312/72, 73, 97.1, 252; 82/152, 173

[56] References Cited

U.S. PATENT DOCUMENTS 2,940,809 6/1960 Herzog ............................ 211/69 X

FOREIGN PATENT DOCUMENTS 603021 6/1948 United Kingdom ................ 206/379

*Primary Examiner*—Steven C. Bishop

*Attorney, Agent, or Firm*—Richard C. Litman

[57] ABSTRACT

A storage system for cutting tool collets comprises a cylindrical drum with a plurality of bored recesses on the front face. These recesses serve to hold individual collets. A pair of cut slots serve to allow easy access to the collets. The drum is mounted upon an elongated version of the normal pivot pin of a milling machine. A rotating cover provides for individual access to the collets and keeps away foreign debris.

12 Claims, 3 Drawing Sheets

ENCLOSED DRUM COLLET STORAGE SYSTEM

BACKGROUND OF THE INVENTION

1. Field of the Invention

The present invention relates to storage receptacles for a plurality of items. More particularly it relates to a storage device for the collets used to hold drill bits, cutters and the like in a milling machine. It allows easy access to a series of various collets of different sizes for quick changes in the milling machine spindle. Keeping the storage device attached to the machine itself allows for the easy access.

Machining processes of various materials often require the use of different sized cutting tools ranging in diameter from $\frac{1}{8}''$ to $\frac{3}{4}''$ shank sizes. Different sized collets are needed to hold these varying cutting tools in the rotating spindle of the milling machine. In manufacturing processes speed or rate of production is an important factor in keeping down costs. The less time that the collets and bits can be changed, the less time is spent on each item being machined. Having the collets quickly available for changes decreases the overall production time. Having a local storage device for the collets also keeps the collets in one place so that time isn't wasted looking for the proper collet.

2. Description of the Prior Art

The following patents are felt to be related to the present invention, but in no way disclose either singly or in combination the applicant's unique device.

U.S. Pat. No. 702,904 issued to Abraham discloses a drum container for cylindrical articles with a plurality of axially disposed cylindrical compartments and with a rotatable cover having apertures that register therewith.

U.S. Pat. Nos. 3,063,551 and 3,319,780 issued to Russell disclose a drill-dispensing container comprising a shell and a plurality of spaced discs with registering apertures mounted on shaft.

U.S. Pat. No. 4,775,055 issued to Morse discloses a container rack having a rotatable holding base with axially disposed apertures surrounded by recesses for holding larger sized articles.

None of the above patents discloses a special holder for a set of milling machine collets and more importantly none of the above patents disclose the special mounting means for the collet storage system adjacent the milling machine.

SUMMARY OF THE INVENTION

The present invention comprises a drum mounted on an elongated pin that replaces the normal pivot pin of a milling machine, such as the type manufactured by the BRIDGEPORT company. These machines have a front work head that contains the spindle and that is pivotably mounted to the base portion of the machine. The pivoting work head allows the angle of the cutting tool in relation to the workpiece to be varied. The mounting of the drum on the machine itself adjacent the user and the spindle allows for fast replacement of the collets. The drum has a plurality of hollowed out recesses or pockets to hold a number of individual collets. These recesses are arcuately arranged about the central axis of the pin. Two slots have been arcuately cut around the arranged recesses to allow for easy finger access to the collets for placing and removing them.

A cover fits over the face of the drum to cover the collets to prevent any dust or metal chips from covering the collets and most importantly from getting inside the collets. Any debris that gets inside a collet can misalign the inserted cutting tool so that an incorrect cut is made on a workpiece. This cover rotates so that certain collets can be accessed to be replaced or removed through an open section of the cover.

Accordingly, it is one object of the present invention to provide a storage system for cutting tool collets that is attached to a milling machine.

It is another object of the present invention to provide a storage system for cutting tool collets that is mounted to the pivot pin of the milling machine.

It is a further object of the present invention to provide a storage system for cutting tool collets that comprises a drum having arcuately arranged recesses to hold the collets.

It is still another object of the present invention to provide a storage system for cutting tool collets having cut out sections near the collet holding recesses to allow for easy access to the collets.

It yet another object of the present invention to provide a storage system for cutting tool collets having a rotating cover that allows for accessing individual collets and serves to keep foreign debris from interfering with the surface of the collet.

These and other objects of the present invention will become readily apparent upon further review of the following specification and drawings.

BRIEF DESCRIPTION OF THE DRAWINGS

Similar reference characters denote corresponding features consistently throughout the attached drawings.

A DETAILED DESCRIPTION OF THE PREFERRED EMBODIMENT

Figure 1:
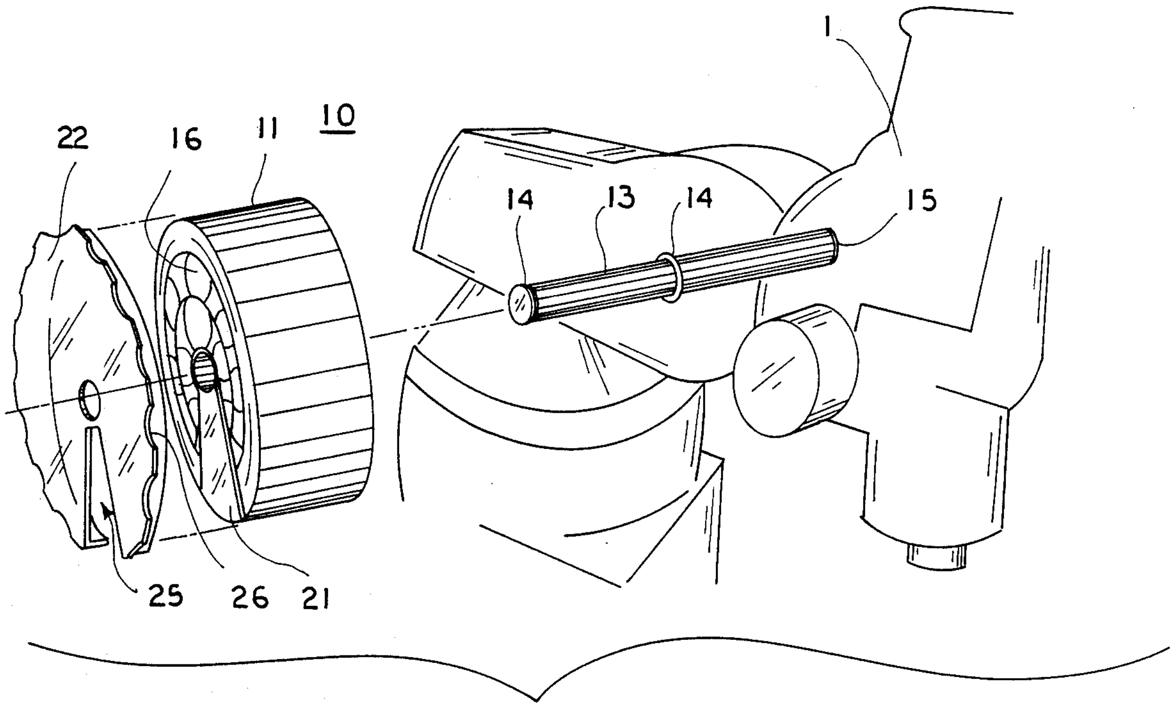
FIG. 1 shows an exploded perspective view of the collet holder, cover and mounting pin with the milling machine shown in outline.

The present invention of a storage system for cutting tool collets 10 is shown in an exploded view in FIG. 1. It comprises a cylindrical drum 11 that is axially mounted by central channel 12 to a pin 13. This pin is an elongated version of a conventional pivot pin used on a milling machine 1 shown in outline. The elongation allows for the mounting of the drum 11. The pin 13 has on the drum end a snap ring 14 that fits into groove 15 on the pin 13. This snap ring 14 serves to keep the drum 11 in place on the pin 13 and is similar to the snap rings 14 used to keep the pin 13 in place in the milling machine 1.

Figure 6:
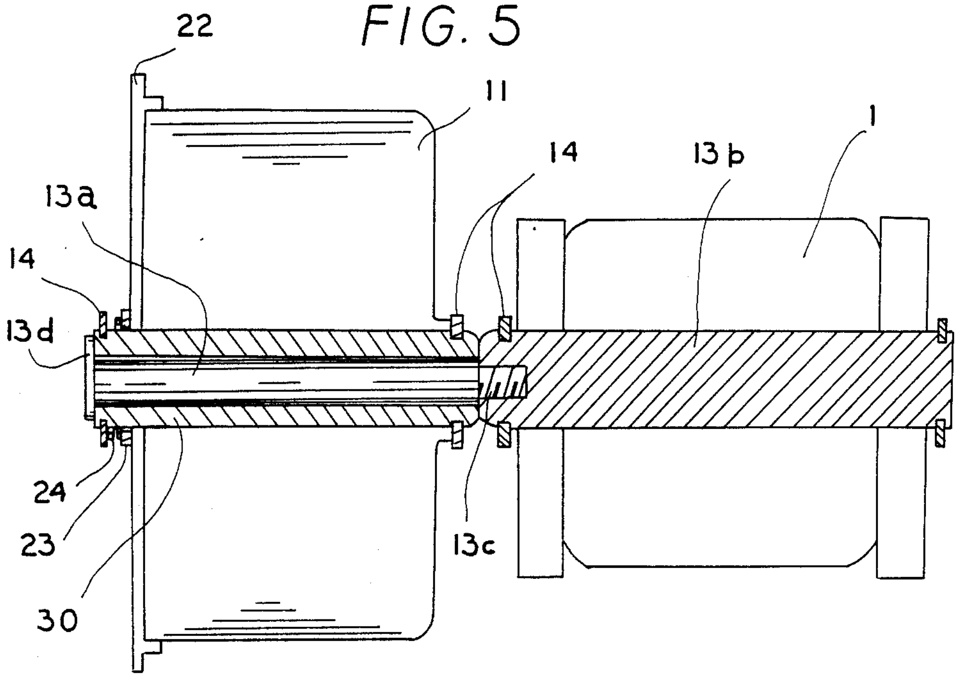
FIG. 6 is a cross-sectional view of the invention showing the two part mounting pin.

An improved form of the pin is shown in FIG. 6. This pin 13 is a two section pin 13*a*, 13*b* that allows for one section 13*a* to be removed without having to remove the whole pin 13 and therefor have to move the milling machine 1. The two sections 13*a*, 13*b* are screwed together by screwthreads 13*c* that mount into a taphole 13*e*. Fitting over the pin section 13*a* is a section of thickwall tubing 30 that abuts against the shoulder bolt 13*d* of pin section 13*a*. Drum 11 mounts over the tubing 30. Snap rings 14 would be in place on the tubing 30 to maintain the drum 11 in position. The shoulder bolt 13*d* should be slightly shorter than the thickwall tubing 30 so as to have positive clamping action that will keep the thickwall tubing 30 from rotating.

Figure 4:
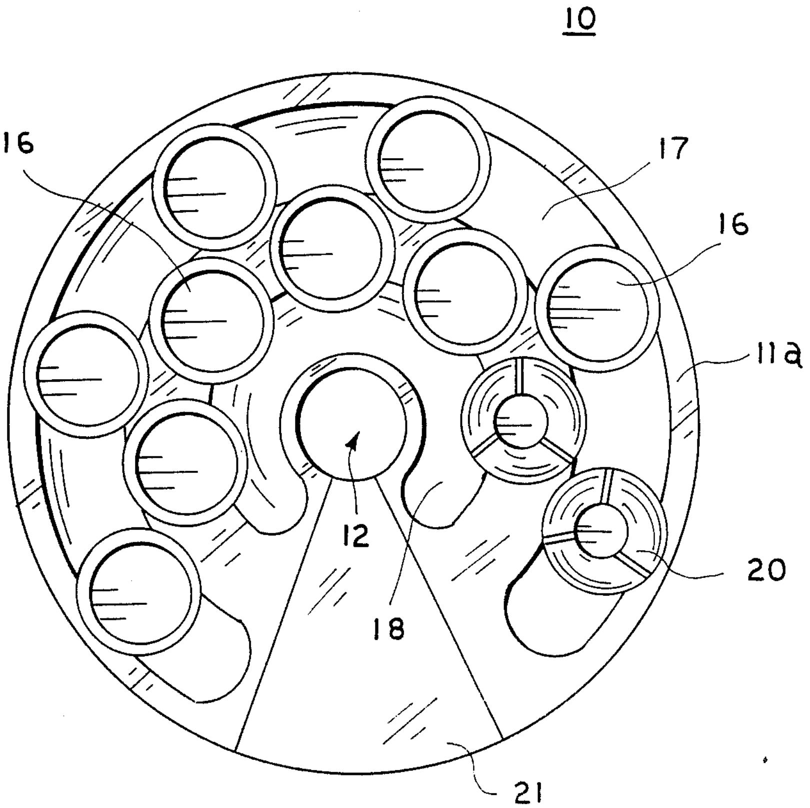
FIG. 4 is a front view of the present invention.

Arranged arcuately about the central axis 12 are a plurality of bored recesses 16 that serve to house the individual collets 20. Also cut in an arcuate manner are two different slots 17, 18 placed at different radii from the central axis 12. These slots 17, 18 serve to allow easy access to the housed collets 20. The slots 17, 18 shown from the front in FIG. 4 can have a rounded bottom that fits against the tips of the fingers in a conforming manner. They can also be left with a flat surface in order to simplify the manufacture of the drum 10.

Figure 2:
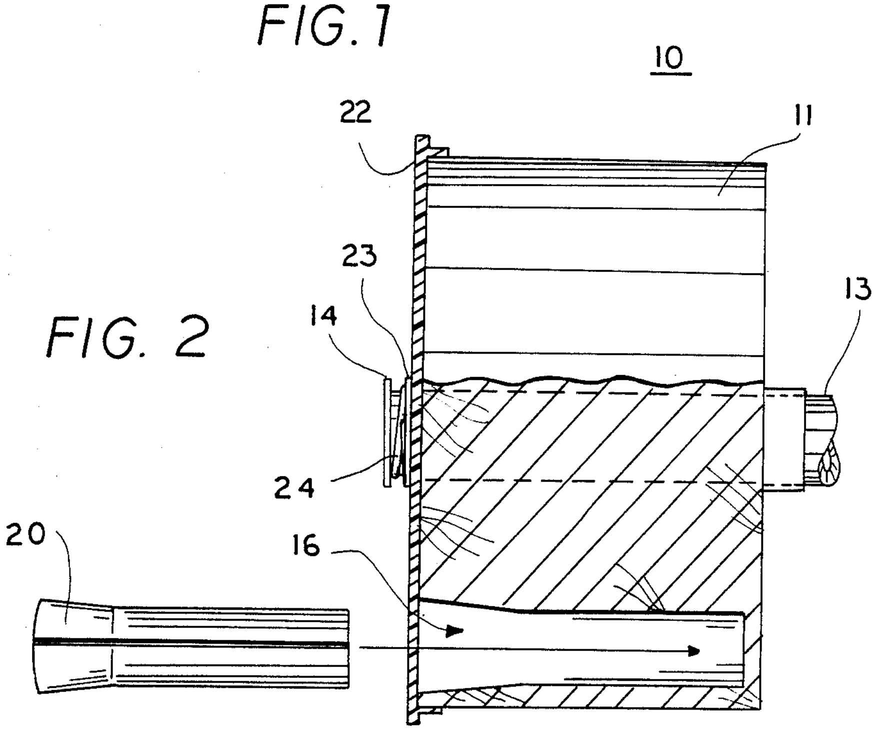
FIG. 2 shows a cross-sectional view of the collet holder detailing the shape of one of the recesses.

The inner outline of the recesses 16 is shown in FIG. 2. The recesses 16 are shaped to snugly fit the outline of the collets 20 for a minimum of vibration when the milling machine 1 is being used. The arrangement of the recesses 16 is only done around an approximately 300° arc. A section 21 of the drum face 11*a* is left uncut. This uncut portion 21 serves as rest zone for the drum cover 22.

Figure 3:
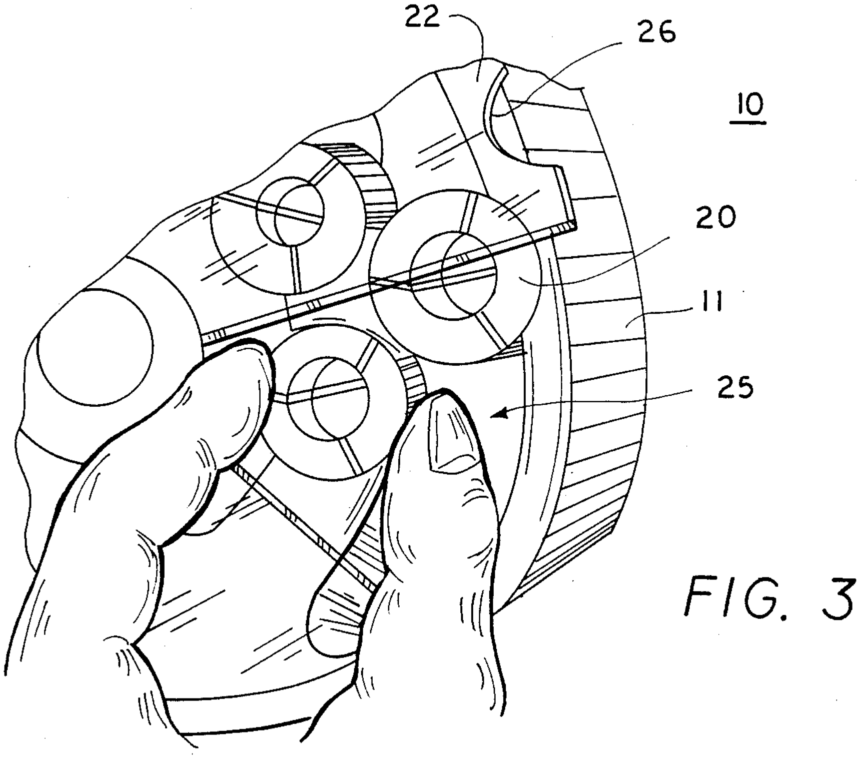
FIG. 3 is a perspective view of the collet holder detailing the removal of one of the collets from the holder.

The cover 22 made of plexiglass or other similar material is rotatably mounted over the drum face 11*a* to cover over the recesses 16. A washer 23 and spring (not shown) between the snap ring 14 and the washer 23 serve to bias the cover 22 against the drum face 11*a*. The washer 23 and the spring 24 being braced against the snap ring 14. The cover 22 has a cut wedge section 25 that serves as the access aperture for the collets 20. The cover 22 can be rotated to a specific recess 16 as shown in FIG. 3 and the collet 20 replaced or removed. In order to remove the chance of stray debris from entering the recesses 16 while the holder 10 is not being used, the cover 22 is rotated until the wedge cut section 25 is over the uncut portion 21 of the drum face 11*a*. Around the edge of the cover 22 is a notched gripping surface 26 that allows for the easy rotation of the cover 22 about the central pin 13.

Figure 5:
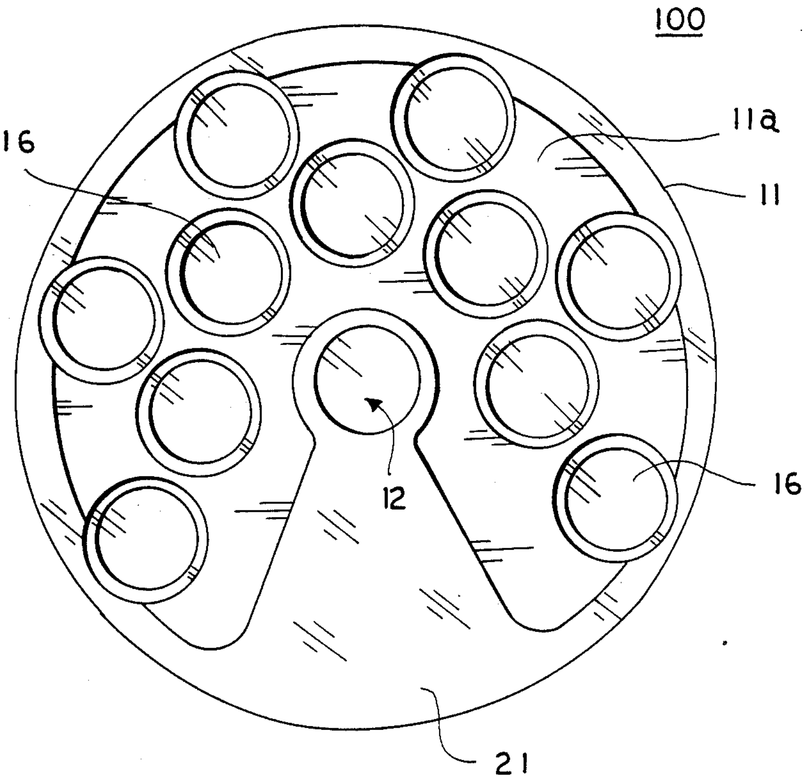
FIG. 5 is a front view of an alternate embodiment of the present invention.

An alternate embodiment 100 of the present invention is depicted in FIG. 5. The difference in features comprises a different arrangement of the front face 11*a* of the drum 11. Instead of having the grooves 17 and 18, the entire front face 11*a* of the drum is recessed, except for a wedge portion 21 as before. The recesses 16 for holding the collets 20 are still arcuately arranged about the drum 11. This verrsion is a simplier to manufacture model of the invention, not requiring nearly as much detailed wood working or plastic molding, as the invention can be constructed using a number of different processes. In all other aspects it functions the same as the embodiment shown in FIGS. 1–4.

It is to be understood that the present invention is not limited to the sole embodiment described above, but encompasses any and all embodiments within the scope of the following claims.

I claim:

1. A storage system for milling machine collets, including:

a cylindrical drum having front and rear faces and a central axial passageway;

an elongated shaft having two opposite ends, one end disposed through said central passageway of said drum and the other of said ends mounted through the conventional pivot pin mount of a milling machine, thereby mounting said drum to the milling machine;

a plurality of bored recesses arcuately disposed about said front face of said drum, said recesses being for holding individual collets;

a cover mounted over said drum face to cover said collets from debris.

2. The storage system according to claim 1, including:

one or more recessed slots arcuately disposed about said drum face to allow easy finger access to said collets held in said bored recesses;

3. The storage system according to claim 1, wherein: said recesses are axially elongated and are parallel to said central passageway.

4. The storage system according to claim 1, wherein: said cover is rotatably mounted to said elongated shaft.

5. The storage system according to claim 4, wherein: said cover has an arcuate wedge portion cut out;

said front face has a corresponding wedge portion that does not contain any of said recesses; whereby said cover can be rotated so that said wedge portion overlies said corresponding wedge portion on said front face with said recesses being covered.

6. The storage system according to claim 1, wherein: said recesses are shaped to match the outline of said collets and to provide a close fit when the collets are inserted therein.

7. The storage system according to claim 4, wherein: said cover is circular in shape with said elongated shaft disposed through the center of said circular cover.

8. The storage system according to claim 7, wherein: said circular cover has an outer edge that is notched, allowing for easy gripping of the cover in order to rotate it.

9. The storage system according to claim 1, wherein: said elongated shaft has a groove at said one end into which is mounted a snap ring thus holding said drum onto said shaft.

10. The storage system according to claim 9, wherein: a washer is disposed between said snap ring and said cover;

a compressed spring is disposed between said snap ring and said washer keeping said cover pressed onto said drum face.

11. The storage system according to claim 1, wherein: said elongated shaft comprises two sections, a first section including a first pin including said one end, an elongated tube mounted concentrically over said first pin, and a second section including said other end attached end to end with said first section, said second section being mounted to the milling machine pivot pin mount with said drum being mounted over said first section and said elongated tube.

12. The storage system according to claim 1, wherein: a substantial portion of said drum front face is recessed, said recessed portion containing said bored recesses.

* * * * *